(No Model.)

M. A. VAIL.
DISH DRAINER.

No. 347,665. Patented Aug. 17, 1886.

Witnesses.
Robert Everett
Dennis Sumby

Inventor:
Martha A. Vail,
By James L. Norris,
Atty.

N. PETERS, Photo-Lithographer, Washington, D. C.

UNITED STATES PATENT OFFICE.

MARTHA A. VAIL, OF NEW MILFORD, PENNSYLVANIA.

DISH-DRAINER.

SPECIFICATION forming part of Letters Patent No. 347,665, dated August 17, 1886.

Application filed April 8, 1886. Serial No. 198,258. (No model.)

*To all whom it may concern:*

Be it known that I, MARTHA A. VAIL, a citizen of the United States, residing at New Milford, in the county of Susquehanna and State of Pennsylvania, have invented new and useful Improvements in Dish-Drainers, of which the following is a specification.

My invention relates to dish-drainers, and the purpose thereof is to provide a simple, convenient, and comparatively inexpensive device, whereby dishes of various sizes and shapes may be drained after washing, and wherein they may be exposed easily to hot or boiling water, which is ordinarily poured over them after they are placed in the drainer, the purpose being to safely and conveniently hold the dishes and allow the boiling water with which they are rinsed to pass off into a lower compartment, whereby the dishes may quickly dry without the application of dish-towels. It is also my purpose to so construct the drainer that all parts thereof shall be accessible for cleansing and drying.

My invention consists in the several novel features of construction and combinations of parts, hereinafter fully shown and fully set forth in the claim annexed to this specification.

Figure 1:
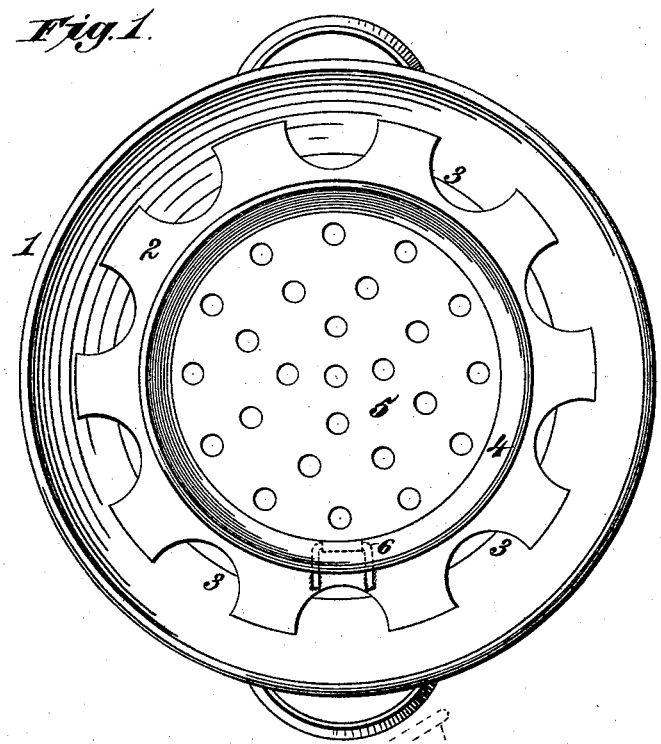
Figure 2:
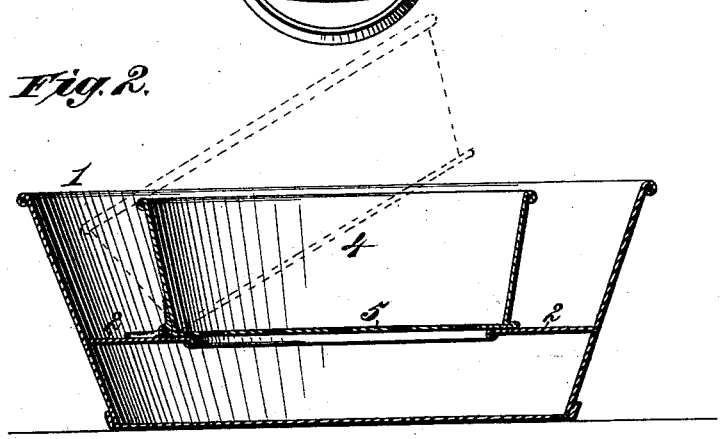

In the accompanying drawings, Figure 1 is a plan view showing my invention. Fig. 2 is a central longitudinal section of Fig. 1.

In the said drawings, the reference-numeral 1 designates an outer pan resembling the ordinary dish-pan in shape and size and of any desired dimensions. Within this pan, at a point between its bottom and its edge or upper rim, is placed an annular diaphragm, 2, having openings 3 in its edge. This diaphragm may be and preferably is rigidly attached to the circular wall of the pan. Upon one side I hinge a supplemental pan, 4, to the inner edge of the annulus 2, said supplemental pan having a perforated bottom, 5, and resting upon the inner margin of the diaphragm 2 when in its normal position. It is, however, so attached to the inner edge of the diaphragm by a hinge, 6, that it may be turned upward, as shown in Fig. 2, thereby giving easy and complete access to the lower portion of the main pan 1 beneath the annulus 2.

In use the larger dishes are placed in the annular space between the inner auxiliary pan, 4, and the main pan 1. The auxiliary pan 4 serves to receive the smaller articles, &c. Hot water may then be poured over them, which will at once pass off into the space below both the central or auxiliary pan and the diaphragm 2, leaving the dishes in position to dry quickly without the use of the towels usually employed.

By hinging the central pan, 4, so that it may be raised, I am able to thoroughly cleanse the interior of the outer pan, as well as to obtain ready access to the bottom of the annular diaphragm 2 and of the central pan, 4, for a similar purpose.

It is evident that I may make the pan oval instead of round, if desired.

What I claim is—

In a dish drainer, the combination, with a pan having an annular perforated diaphragm raised above its bottom, of a central supplemental pan having a perforated bottom and hinged to the edge of the annular diaphragm, substantially as described.

In testimony whereof I affix my signature in presence of two witnesses.

MARTHA A. VAIL.

Witnesses:
G. C. HOWELL,
CHESTER S. VAIL.